United States Patent
Iyer et al.

(10) Patent No.: US 11,321,250 B2
(45) Date of Patent: May 3, 2022

(54) INPUT/OUTPUT DEVICE SELECTION SYSTEM

(71) Applicant: Dell Products L.P., Round Rock, TX (US)

(72) Inventors: Shyam Iyer, Cedar Park, TX (US); Srinivas Giri Raju Gowda, Santa Clara, CA (US); Anh Dinh Luong, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/941,370

(22) Filed: Jul. 28, 2020

(65) Prior Publication Data

US 2022/0035753 A1 Feb. 3, 2022

(51) Int. Cl.
 *G06F 13/14* (2006.01)
 *G06F 13/16* (2006.01)
(52) U.S. Cl.
 CPC ............................... *G06F 13/1668* (2013.01)
(58) Field of Classification Search
 CPC ...................................................... G06F 13/1668
 IPC ............................................... G06F 13/12,13/14
 See application file for complete search history.

(56) References Cited

U.S. PATENT DOCUMENTS

| | | | | |
|---|---|---|---|---|
| 7,844,756 | B2 | 11/2010 | Cannon et al. | |
| 8,032,884 | B2* | 10/2011 | Parekh | G06F 9/4881 718/100 |
| 8,046,559 | B2* | 10/2011 | Zheng | G06F 13/28 711/167 |
| 8,443,376 | B2* | 5/2013 | Bhandari | G06F 9/5044 719/312 |
| 8,645,958 | B2* | 2/2014 | Huetter | G06F 9/5066 718/101 |
| 8,656,397 | B2* | 2/2014 | Eidus | G06F 9/5088 718/102 |
| 9,047,196 | B2* | 6/2015 | Gounares | G06F 12/0817 |
| 9,081,621 | B2* | 7/2015 | Fahrig | G06F 13/24 |
| 9,648,102 | B1* | 5/2017 | Davis | H04L 67/1097 |
| 9,792,051 | B2* | 10/2017 | Liu | G06F 3/0613 |
| 10,019,167 | B2* | 7/2018 | Gray | G06F 3/0644 |
| 10,255,091 | B2* | 4/2019 | Kim | G06F 9/45554 |
| 10,445,009 | B2* | 10/2019 | Whaley | G06F 3/0665 |
| 2012/0297131 | A1* | 11/2012 | Chung | G06F 12/0215 711/105 |
| 2017/0371777 | A1* | 12/2017 | Kim | G06F 9/5016 |
| 2019/0166019 | A1* | 5/2019 | Jagadeesh | H04L 47/70 |

\* cited by examiner

*Primary Examiner* — Cheng Yuan Tseng
(74) *Attorney, Agent, or Firm* — Joseph Mencher

(57) ABSTRACT

An I/O device selection system includes a memory system, I/O devices that are coupled to the memory system; and an I/O scheduler that is coupled to the I/O devices. The I/O scheduler receives an I/O request that that is directed to the memory system, and determines at least one I/O operation that is configured to satisfy the I/O request. The I/O scheduler then identifies an operating level of the I/O devices that are configured to perform the at least one I/O operation and, based on the operating level of the I/O devices, selects a subset of the I/O devices for performing the at least one I/O operation, and transmits at least one I/O operation instruction that is configured to cause the subset of the I/O devices to perform the at least one I/O operation in order to satisfy the I/O request.

20 Claims, 10 Drawing Sheets

INPUT/OUTPUT DEVICE SELECTION SYSTEM

BACKGROUND

The present disclosure relates generally to information handling systems, and more particularly to selecting Input/Output (IO) devices for performing data operations in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server computing devices and/or other computing devices known in the art, utilize I/O devices such as data mover devices, I/O hub devices, and memory controllers, in order to perform data operations in the computing device. However, the selection of which I/O devices to utilize in performing a data operation in some computing device configurations can raise some issues. For example, the processing system in some server computing devices may include multiple processor subsystems (e.g., multiple Central Processing Units (CPUs)) coupled together by processor interconnect(s) (e.g., Ultra Path Interconnect(s) (UPI(s)) provided in processing systems available from INTEL® Corporation of Santa Clara, Calif., United States), the memory system may provide a respective memory subsystem for each processor subsystem (with each respective memory subsystem often called the "local memory" for its associated processor subsystem), and the processing system/memory system may be configured in a Non-Uniform Memory Access (NUMA) design in which each processing subsystem/memory subsystem combination provides a respective "NUMA node", with memory access times for processing subsystems depending on the memory subsystem location relative to the processor subsystem performing the memory access, and processor subsystems capable of accessing their local memory subsystem faster than non-local memory subsystems (i.e., the memory subsystem that is local to the other processor subsystem(s)).

In such NUMA configurations, there may exist multiple different combinations of I/O devices that are capable of performing any particular data operation. However, similarly to the processing subsystems discussed above, data transfer times and memory access times for some I/O devices will depend on the memory subsystem location relative to the I/O device performing a data transfer or memory access required to complete the data operation, as well as the current operating bandwidth of any I/O devices being utilized to perform those data transfer(s) or memory access(es), and conventional I/O device selection techniques can result in inefficient data operations in the server computing device (e.g., a first subset of I/O devices selected to perform the data operation may provide for slower data transfers relative to other subsets of I/O devices available in the server computing device).

Accordingly, it would be desirable to provide an I/O device selection system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Input/Output (I/O) scheduler engine that is configured to: receive an I/O request that that is directed to a memory system; determine at least one I/O operation that is configured to satisfy the I/O request; identify an operating level of a plurality of I/O devices that are coupled to the memory system and that are configured to perform the at least one I/O operation; select, based on the operating level of the plurality the I/O devices, a subset of the plurality of I/O devices for performing the at least one I/O operation; and transmit at least one I/O operation instruction that is configured to cause the subset of the plurality of I/O devices to perform the at least one I/O operation in order to satisfy the I/O request.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
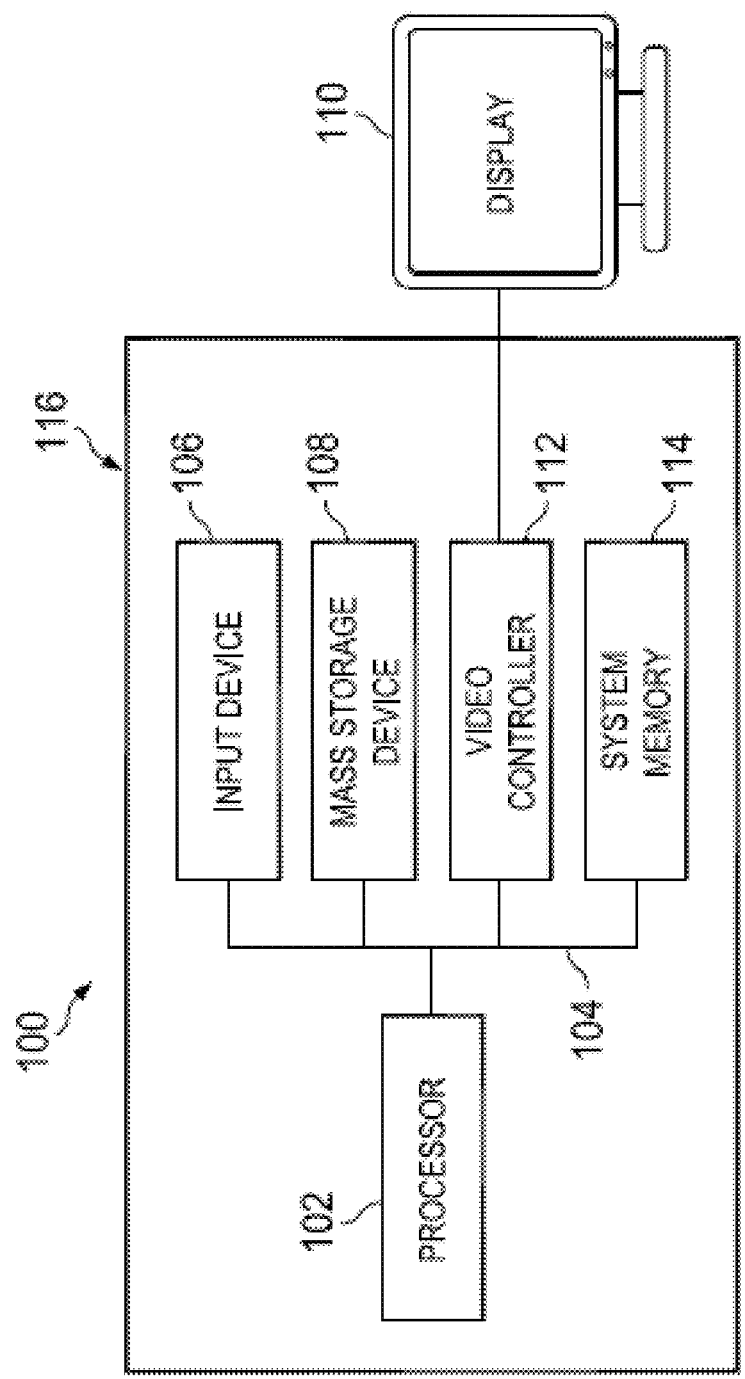
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
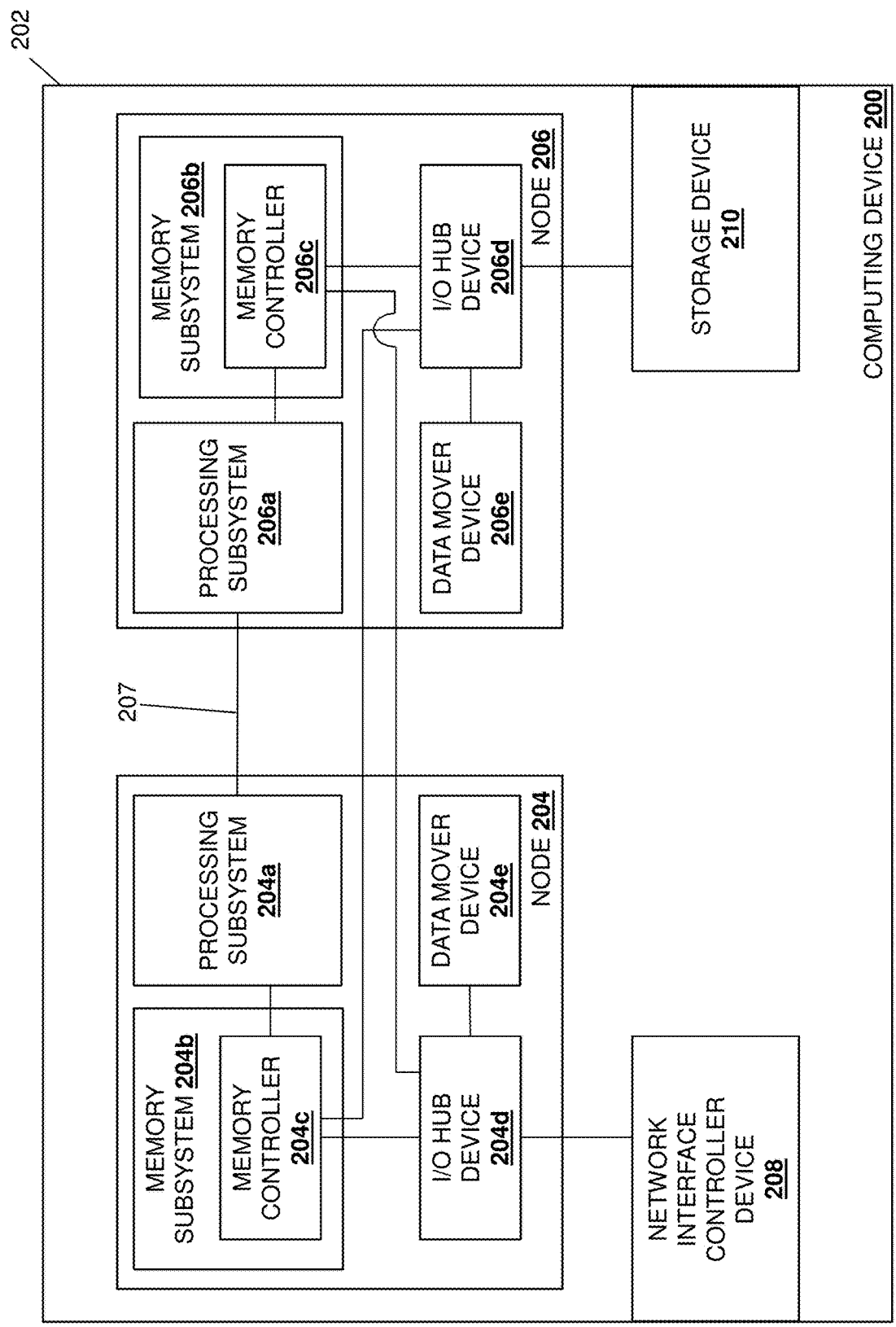
FIG. 2 is a schematic view illustrating an embodiment of a computing device that may utilize the I/O device selection system of the present disclosure.

Referring now to FIG. 2, an embodiment of a computing device 200 is illustrated that may utilize the I/O device selection system of the present disclosure. In an embodiment, the computing device 200 may be provided by the IHS 100 discussed above with reference to FIG. 1 and/or may include some or all of the components of the IHS 100, and in specific examples may be provided by a server computing device. However, while illustrated and discussed as being provided by a server computing device, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated below. For example, as discussed below, the chassis 202 may house a processing system (e.g., which may include the processor 102 discussed above with reference to FIG. 1) and a memory system (e.g., which may include the memory 114 discussed above with reference to FIG. 1) that is coupled to the processing system and that includes instructions that, when executed by the processing system, cause the processing system to provide an operating system engine and/or application engine(s) that are configured to perform the functionality of the operating systems, applications, and/or computing devices discussed below.

In the example illustrated in FIG. 2, the processing system and memory system housed in the chassis 202 are provided in a Non-Uniform Memory Access (NUMA) configuration including a pair of nodes 204 and 206 (e.g., "NUMA nodes"). However, while only two nodes 204 and 206 are illustrated and described in the examples below, one of skill in the art in possession of the present disclosure will recognize that NUMA configurations may include additional nodes that are similar to the nodes 204 and 206 discussed herein. In the illustrated embodiment, the node 204 includes a processing subsystem 204a that is part of the processing system provided in the chassis 202 and that may be provided by a Central Processing Unit (CPU) or other processing subsystems known in the art. The node 204 also includes a memory subsystem 204b that is part of the memory system provided in the chassis 202, and that may be provided by the memory controller 204c that is coupled to the processing subsystem 204a (as illustrated in FIG. 2), as well by as Dual Inline Memory Modules (DIMMs) and/or other memory components known in the art. The node 204 also includes an I/O hub device 204d that is coupled to the memory controller 204c, and a data mover device 204e that is coupled to the I/O hub device 204d. As discussed above, in an embodiment, the data mover device 204e may be included as part of a processing subsystem package (e.g., a CPU package that provides the processing subsystem 204a/CPU) while being a separate component from the processor core(s) (i.e., in order to allow the data mover device 204c to offload data transfer operations from those processor core(s)).

Similarly, the node 206 includes a processing subsystem 206a that is part of the processing system provided in the chassis 202 and that may be provided by a Central Processing Unit (CPU) or other processing subsystems known in the art. As illustrated, the processing subsystem 204a in the node 204 and the processing subsystem 206a in the node 206 may be coupled together by a processing subsystem interconnect 207 (e.g., the UPI discussed above). The node 206 also includes a memory subsystem 206b that is part of the memory system provided in the chassis 202, and that may be provided by the memory controller 206c that is coupled to the processing subsystem 206a and the I/O hub device 204d in the node 204 (as illustrated in FIG. 2), as well by as Dual Inline Memory Modules (DIMMs) and/or other memory components known in the art. The node 206 also includes an I/O hub device 206d that is coupled to the memory controller 206c, as well as to the memory controller 204c in the memory subsystem 204b included in the node 204. The node 206 also includes a data mover device 206e that is coupled to the I/O hub device 206d. As discussed above, in an embodiment, the data mover device 206e may be included as part of a processing subsystem package (e.g., a CPU package that provides the processing subsystem 206a/CPU) while being a separate component from the processor core(s) (i.e., in order to allow the data mover device 206c to offload data transfer operations from those processor core(s)).

However, while respective data mover devices 204e and 206e are illustrated and described below as being provided with each node, one of skill in the art in possession of the present disclosure will recognize that other data mover device configurations will fall within the scope of the present disclosure as well. For example, either of the nodes 204 and 206 may include multiple data mover devices, or may not include a data mover device. In specific examples, the data mover devices of the present disclosure may be provided by a Pass-Through Direct Memory Access (PTDMA) engine provided by ADVANCED MICRO DEVICES® of Santa Clara, Calif., United States; a Data Streaming Accelerator (DSA) or Crystal Beach Direct Memory Access (CBDMA) engine available from INTEL® Corporation of Santa Clara, Calif., United States; and/or any other data mover device that one of skill in the art in possession of the present disclosure would recognize that enabling the direct memory-to-memory data transfers discussed herein. Furthermore, while discussed above as being provided as part of a processing subsystem package in the node, one of skill in the art in possession of the present disclosure will recognize that data mover devices may be provided as part of a built-in controller, as part of an add-in card that is connected to a motherboard in the computing device that is also coupled to the nodes 204 and 206, and/or in a variety of other data mover device configurations that will fall within the scope of the present disclosure as well.

In specific examples, the data mover devices of the present disclosure may be integrated into a Central Processing Unit (CPU) System on a Chip (SoC) such as with the AMD® PTDMA engine or INTEL® CBDMA engine discussed above, implemented as discrete Peripheral Component Interconnect express (PCIe) add-in cards that are localized to specific CPUs, and/or in any other manner that would be apparent to one of skill in the art in possession of the present disclosure. As will be appreciated by one of skill in the art in possession of the present disclosure, CPU SoC systems may provide many physical functions, with each associated with a different "distance" to memory channels that provide access to a memory subsystem. For example, the AMD® PTDMA engine discussed above provides each PTDMA engine in the same quadrant an equal distance to two available memory channels in that quadrant, but a longer distance to six available memory channels in the other quadrants. Furthermore, one of skill in the art in possession of the present disclosure will recognize that for memory-to-memory data transfers via a data mover device, memory read operations are associated with longer latencies than memory write operations, thus providing relatively lower latencies when reading from local memory subsystems and writing to remote memory subsystems.

As such, the processor subsystem 204a/memory subsystem 204b may provide a first NUMA node (e.g., "NUMA node 0") that includes I/O devices such as the memory controller 204c, the I/O hub device 204d, and the data mover device 204e. Similarly, the processor subsystem 206a/memory subsystem 206b may provide a second NUMA node (e.g., "NUMA node 1") that includes I/O devices such as the memory controller 206c, the I/O hub device 206d, and the data mover device 206e, and that is coupled to the first NUMA node via the processing subsystem interconnect/UPI 207. However, while particular processing subsystem/memory subsystem nodes are described in a two-processing subsystem/memory subsystem node configuration, one of skill in the art in possession of the present disclosure will recognize that other processing subsystem/memory subsystem node systems will fall within the scope of the present disclosure as well. Furthermore, while the examples of I/O devices below include memory controllers 204c/206c, I/O hub devices 204d/206d, and data mover devices 204e/206e, one of skill in the art in possession of the present disclosure will appreciate that other I/O devices (or I/O-related devices that operate with I/O devices) will fall within the scope of the present disclosure as well.

Thus, one of skill in the art in possession of the present disclosure will appreciate that the nodes 204 and 206 illustrated in FIG. 2 provide an example of a NUMA configuration in which local memory subsystems are provided for each processing subsystem in a multi-processor system, and memory subsystem access times depend on the relative location of the memory subsystem and the processing subsystem performing the memory access operations, with processing subsystems able to access their local memory subsystems faster than memory subsystems that are not local (i.e., memory subsystems that are local to another processing subsystem.) However, while a NUMA memory design is illustrated and discussed below, other processing system/memory system configurations may benefit from the teachings of the present disclosure and thus are envisioned as falling within its scope as well.

In the illustrated embodiment and for the purposes of the examples provided below, the chassis 202 also houses a Network Interface Controller (NIC) device 208 that is coupled to the I/O hub device 204d in the node 204, and a storage device 210 that is coupled to the I/O hub device 206d in the node 206. One of skill in the art in possession of the present disclosure will recognize that the NIC device 208 may provide a communication subsystem in the chassis 202 that connects to a network such as a Local Area Network (LAN), the Internet, combinations thereof, and/or other networks known in the art. As discussed below, the NIC device 208 may receive data via the network and provide that data to one or more components in the computing device 200. One of skill in the art in possession of the present disclosure will also recognize that the storage device 210 may be provided by a Solid-State Drive (SSD) (e.g., a Non-Volatile Memory express (NVMe) SSD) and, as discussed below, the storage device 210 may store data received by the NIC device 208. However, while a data operation is described below that provides for the storage of data received by the NIC device 208 on the storage device 210, one of skill in the art in possession of the present disclosure will recognize that a wide variety of other data operations will fall within the scope of the present disclosure as well. Furthermore, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
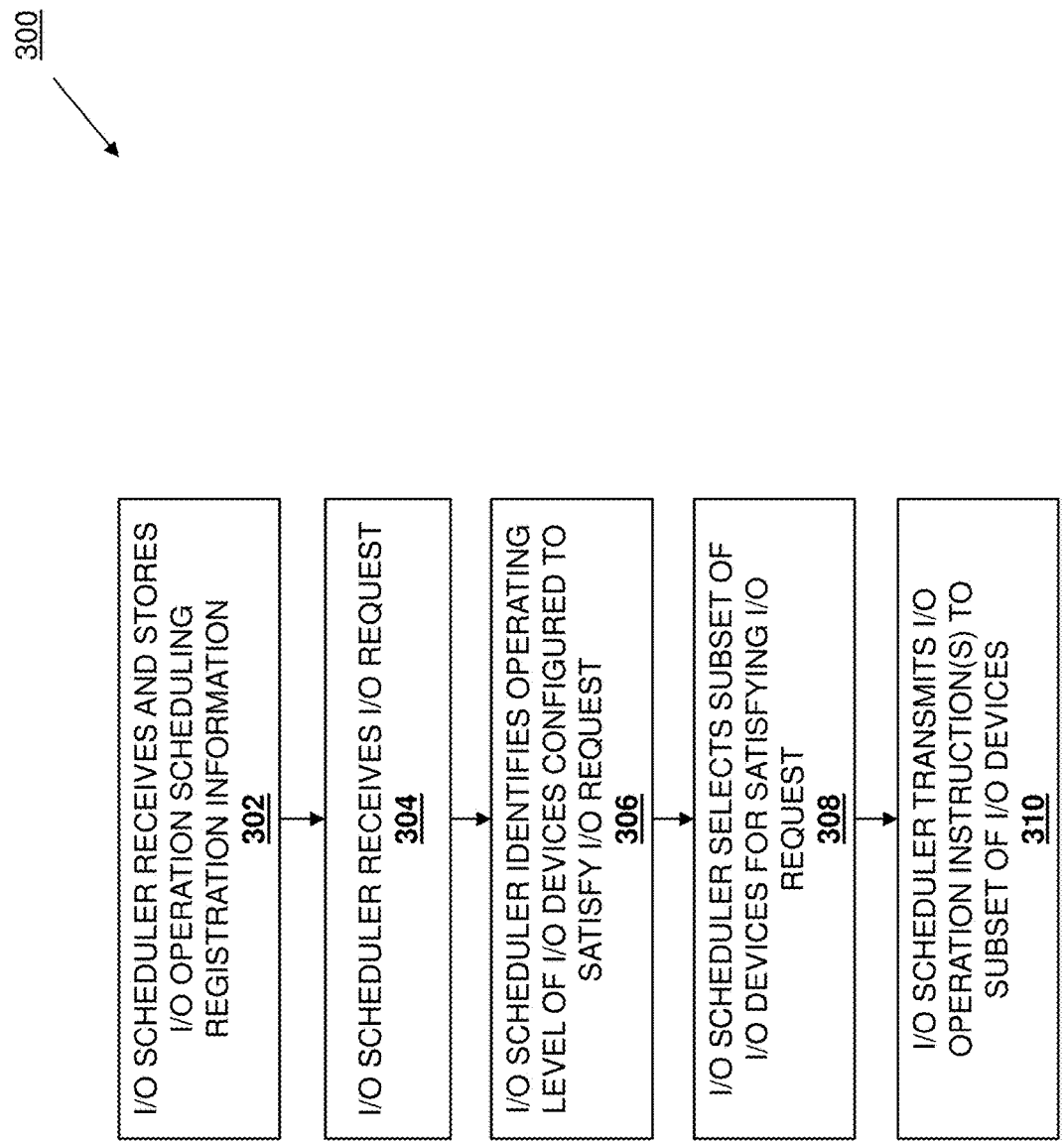
FIG. 3 is a flow chart illustrating an embodiment of a method for selecting I/O devices for performing a data operation.

Referring now to FIG. 3, an embodiment of a method 300 for selecting I/O devices for performing a data operation is illustrated. As discussed below, the systems and methods of the present disclosure provide for the selection of I/O device(s) in a computing device for performing a data operation based on a data operation "pipeline" in that computing device, which operates to consider an operating level of available I/O device(s) prior to that data operation, and the operating level of available I/O device(s) subsequent to that data operation, thus helping to improve cache locality, cache injection of data, and ongoing I/O activities via that I/O device selection. For example, the I/O device selection system includes an I/O scheduler that is coupled to a plurality of I/O devices that are coupled to a memory system, with the I/O scheduler receiving an I/O request that that is directed to the memory system, determining at least one I/O operation that is configured to satisfy the I/O request, and identifying an operating level of the plurality of I/O devices that are configured to perform the at least one I/O operation. Based on the operating level of the plurality the I/O devices, the I/O scheduler selects a subset of the plurality of I/O devices for performing the at least one I/O operation, and transmits at least one I/O operation instruction that is configured to cause the subset of the plurality of I/O devices to perform the at least one I/O operation in order to satisfy the I/O request. As such, the subset of I/O device(s) in a computing device that are selected to perform a data operation may be the most efficient I/O devices for performing that data operation in the computing device based on a current operating situation for that computing device.

Figure 4A:
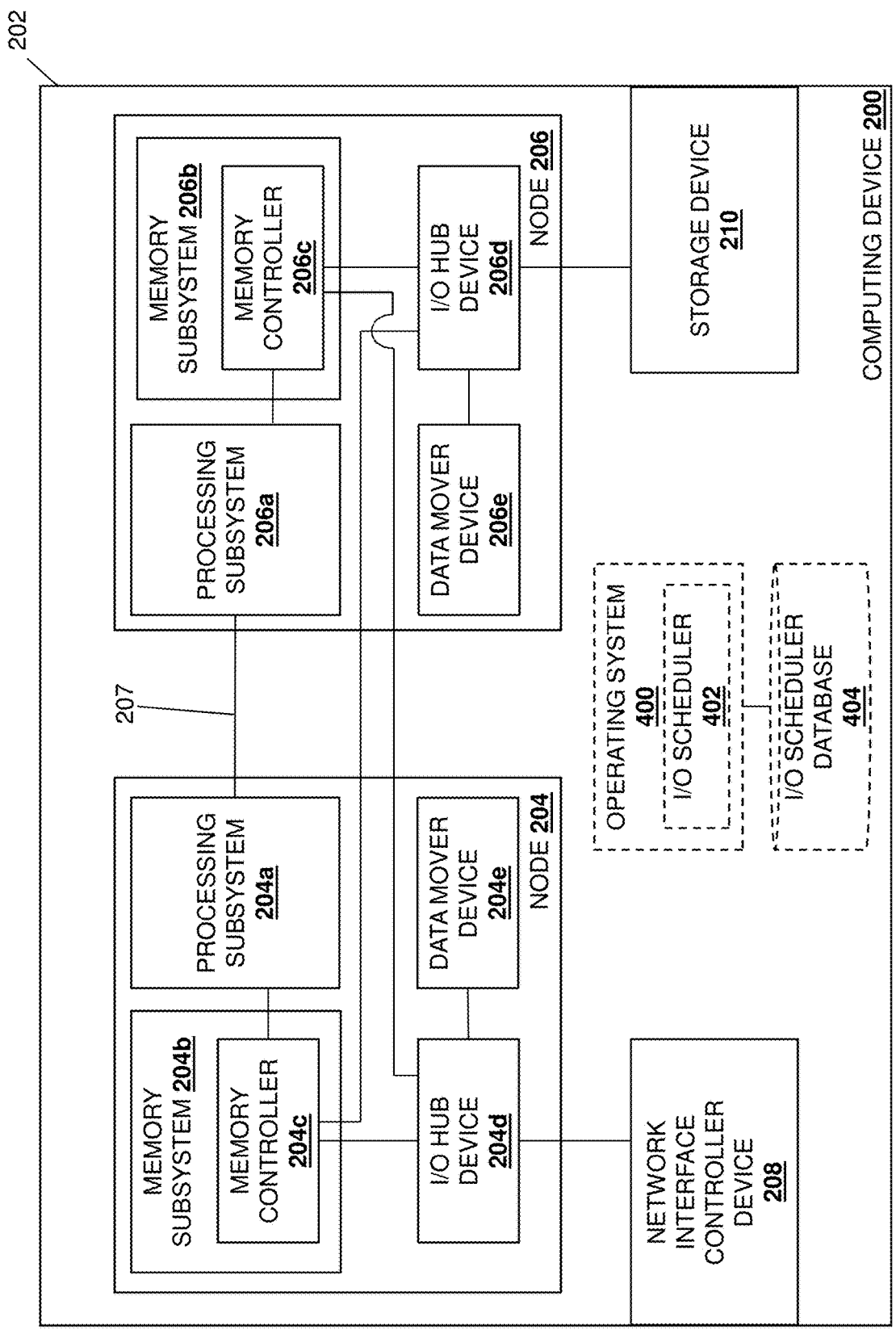
FIG. 4A is a schematic view illustrating an embodiment of the computing device operating during the method of FIG. 3.

The method 300 begins at block 302 where an I/O scheduler receives and stores I/O operation scheduling registration information. With reference to FIG. 4A, in some embodiments, the processing subsystems 204a and/or 204b in the nodes 204 and/or 206 may operate to execute instructions stored on the memory subsystems 204b and/or 206b in order to provide an operating system 400. In the illustrated embodiment, the operating system 400 includes an I/O scheduler engine that provides an I/O scheduler 402 that is configured to perform the functionality of the I/O schedulers and/or operating systems discussed below. However, while illustrated and described as being provided by an operating system 400, one of skill in the art in possession of the present disclosure will recognize that the I/O scheduler 402 may be provided by a driver and/or other subsystem known in the art. Furthermore, while the I/O scheduler 402 is illustrated as being provided in the computing device 200, one of skill in the art in possession of the present disclosure will appreciate that I/O schedulers may be provided outside the computing device, and/or may perform I/O scheduler operations for more than one computing device, while remaining within the scope of the present disclosure as well. In the illustrated embodiment, the operating system 400 and I/O scheduler 402 are coupled to an I/O scheduler database 404 that may be stored in the memory subsystems 204b and/or 206b, in another storage system in the computing device 200, and/or in any other storage location that would be apparent to one of skill in the art in possession of the present disclosure.

Figure 4B:
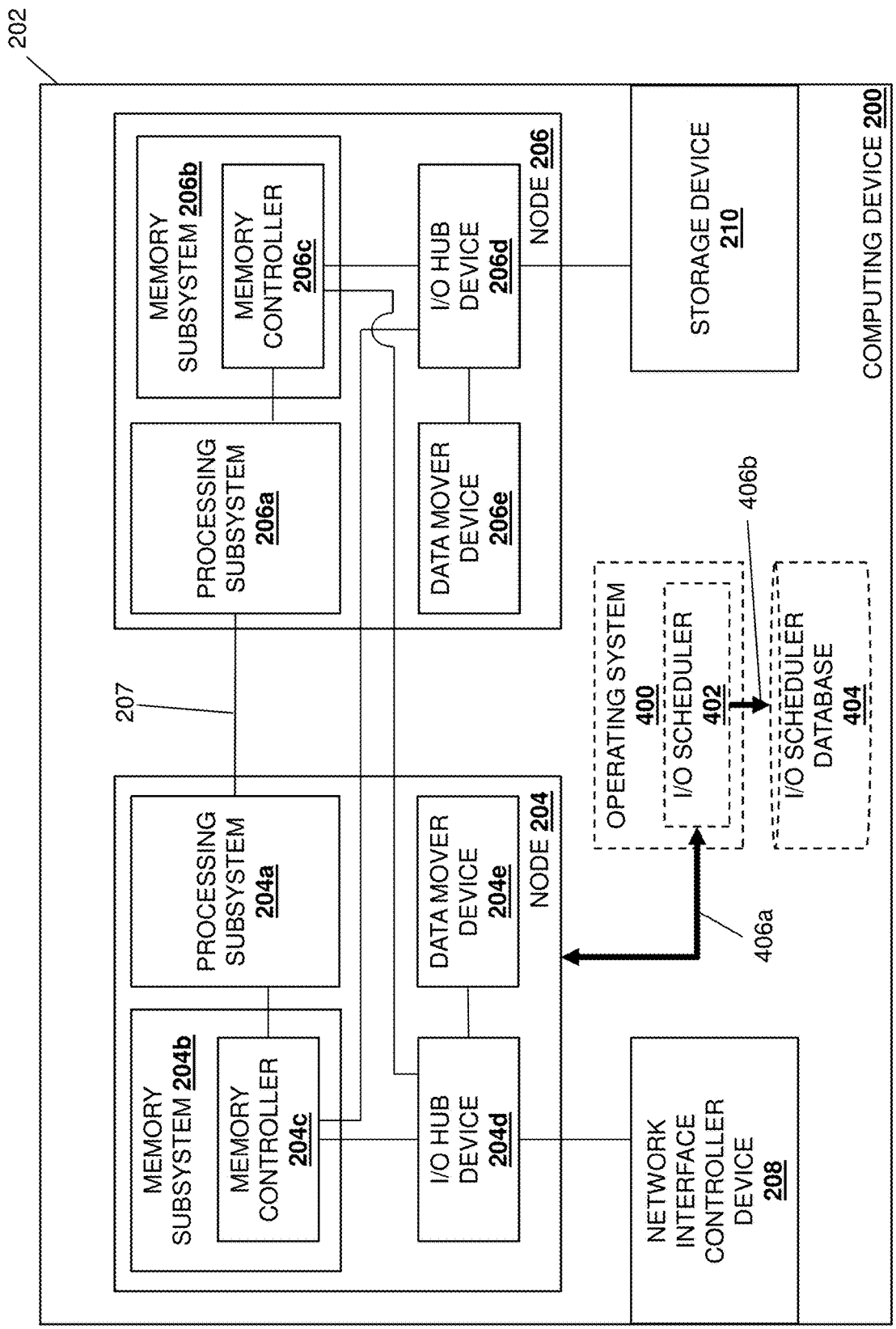
FIG. 4B is a schematic view illustrating an embodiment of the computing device operating during the method of FIG. 3.
Figure 4C:
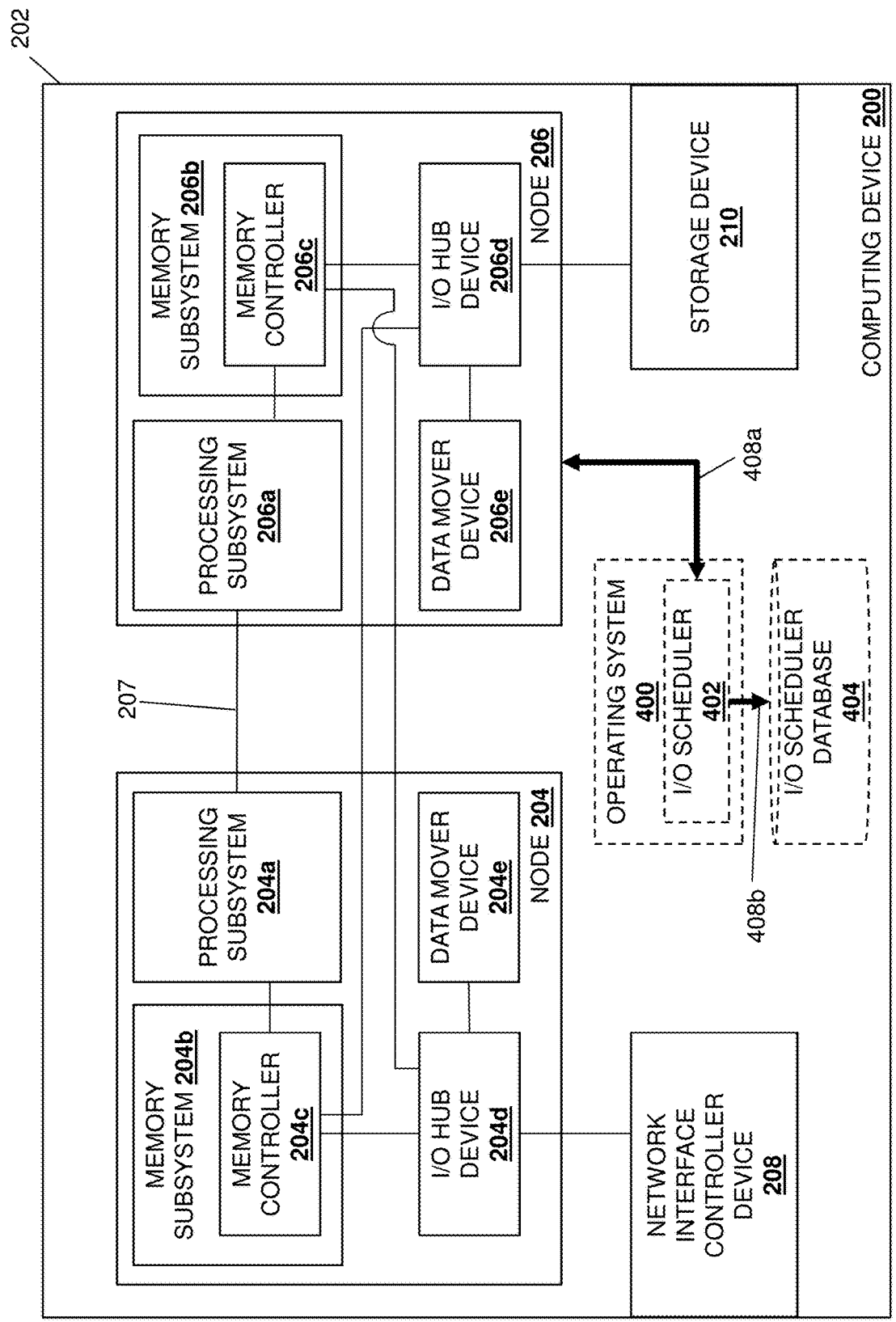
FIG. 4C is a schematic view illustrating an embodiment of the computing device operating during the method of FIG. 3.

With reference to FIGS. 4B and 4C, at block 302, the I/O scheduler 402 may perform I/O operation scheduling registration operations 406a with components in the node 204, as well as I/O operation scheduling registration operations 408a with components in the node 206, in order to receive I/O operation scheduling registration information from each of those components. The I/O scheduler 402 may then perform I/O operation scheduling registration information storage operations 406b and 408b that operate to store that I/O operation scheduling registration information in the I/O scheduler database 404. As will be understood by one of skill in the art in possession of the present disclosure, one or more drivers may be provided for the I/O devices in the computing device 200 in order to allow them to provide I/O operation scheduling registration information to the I/O scheduler 402 at block 302.

As such, with reference to the specific example illustrated in FIGS. 4A, 4B, and 4C, the I/O operation scheduling registration operations 406a may include a driver associated with the memory controller 204c in the node 204 providing I/O operation scheduling registration information to the I/O scheduler 402, a driver associated with the I/O hub device 204d in the node 204 providing I/O operation scheduling registration information to the I/O scheduler 402, and a driver associated with the data mover device 204e in the node 204 providing I/O operation scheduling registration information to the I/O scheduler 402. Similarly, the I/O operation scheduling registration operations 406b may include a driver associated with the memory controller 206c in the node 206 providing I/O operation scheduling registration information to the I/O scheduler 402, a driver associated with the I/O hub device 206d in the node 206 providing I/O operation scheduling registration information to the I/O scheduler 402, and a driver associated with the data mover device 206e in the node 206 providing I/O operation scheduling registration information to the I/O scheduler 402.

However, while specific components in each of the nodes 204 and 206 are described as registering with the I/O scheduler 402 at block 302, one of skill in the art in possession of the present disclosure will appreciate that some components discussed above may not need to register with the I/O scheduler 402 at block 302. For example, the memory controllers 204c and 206c and the I/O hubs 204d and 206d may not register with the I/O scheduler 402 at block 302, as the I/O scheduler 402 may include an interface (e.g., a register interface, a command interface, and/or other interfaces that would be apparent to one of skill in the art in possession of the present disclosure) that allows the I/O scheduler to retrieve traffic utilization data (e.g., memory traffic data, I/O hub traffic data, etc.) from traffic utilization counters in order to identify system component bottlenecks. As such, only a subset of the components in the computing device 200 (e.g., the data mover device 204e, the data mover device 206e, the network interface controller device 208, and the storage device 210) may register with the I/O scheduler 402 at block 302 to identify themselves as an I/O device that may perform a Direct Memory Access (DMA) operation in the computing device 200.

As will be appreciated by one of skill in the art in possession of the present disclosure, I/O device drivers provided for I/O devices in the computing device 200 may register their DMA capabilities when they register their I/O device during enumeration, and the registration at block 302 allows the I/O scheduler 402 to become aware of the I/O devices in the computing device 200 that are capable of performing DMA operations. In an embodiment, the I/O operation scheduling registration information received by I/O scheduler 402 at block 302 may include an affinity of an I/O device with a node (e.g., a NUMA node), a bandwidth speed of an I/O device (e.g., a bandwidth associated with a PCIe generation 3 I/O device, a bandwidth associated with a PCIe generation 4 I/O device, etc.), a link width available to the I/O device (e.g., ×8, ×16, etc.), and/or other registration information that would be apparent to one of skill in the art in possession of the present disclosure. As will be appreciated by one of skill in the art in possession of the present disclosure from the discussion below, the I/O scheduler 402 may receive any information during the registration performed at block 302 that would allow it to make decisions based on system performance and/or load when an I/O device DMA request is received (e.g., along with an I/O request in its queue, the performance counters it may read from the memory controllers 204c and 206c and/or I/O hub devices 204d and 206d allow the I/O scheduler 402 to make a wholistic decision on scheduling the I/O requests, rearranging the I/O requests in consideration of the performance of the computing device 200, and/or other operations that would be apparent to one of skill in the art in possession of the present disclosure).

Thus, the registration/subscribing by the I/O devices in the nodes 204 and 206 allows the driver(s) associated with the I/O devices to declare their I/O devices as participants in the I/O device selection system of the present disclosure. As such, the I/O operation scheduling registration information stored in the I/O scheduler database 404 allows the I/O scheduler 402 to identify each I/O device in the computing device 200, the location of that I/O device (e.g., the node 204 or the node 206), and/or other information that provides for the I/O device selection functionality discussed below. In a specific example, the I/O operation scheduling registration information stored in the I/O scheduler database 404 may allow the I/O scheduler 402 to identify the memory controller 204c and the I/O hub device 204d in the node 204, the memory controller 206c and the I/O hub device 206d in the node 206, and the data mover devices 204e and 206e in the nodes 204 and 206.

Figure 4D:
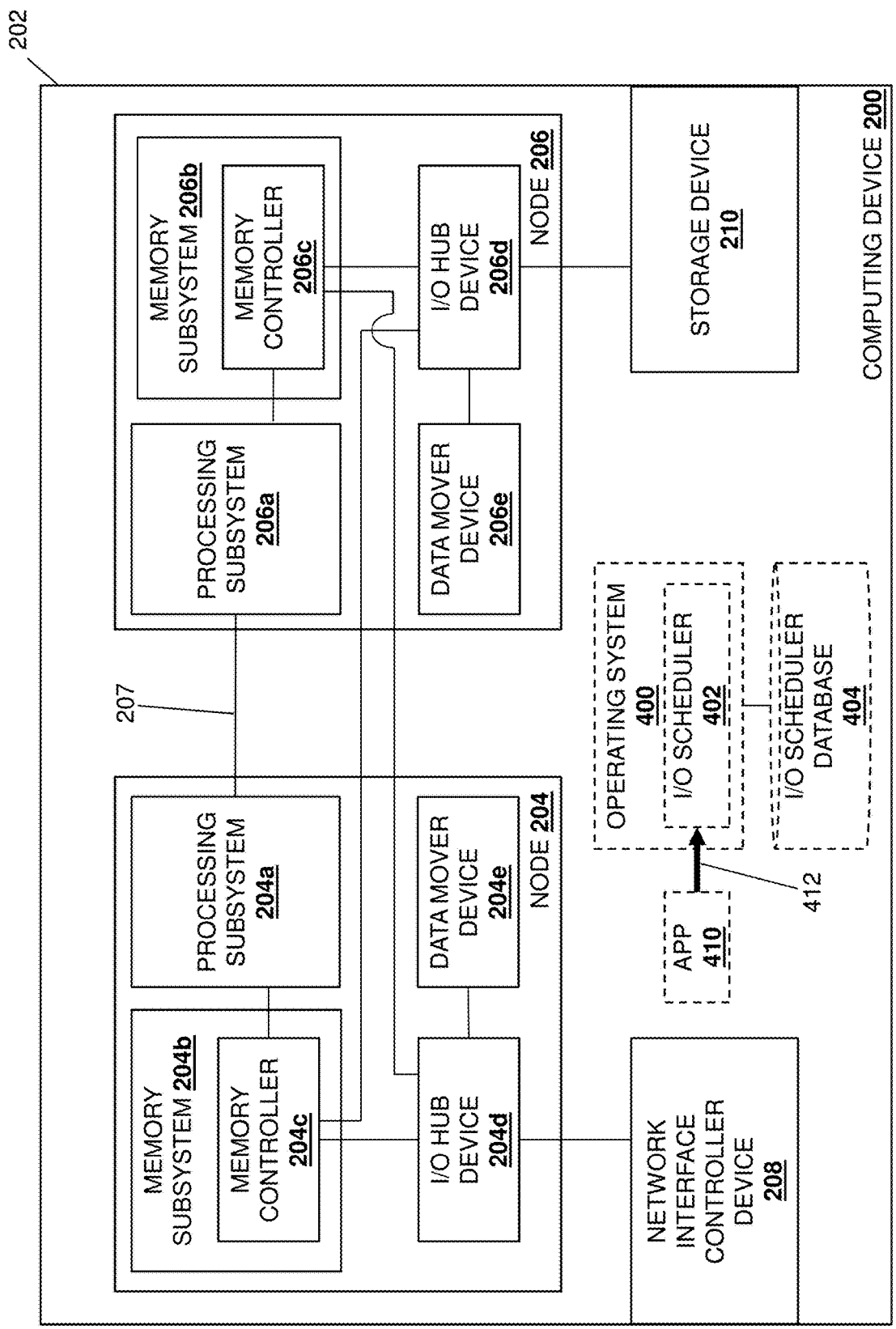
FIG. 4D is a schematic view illustrating an embodiment of the computing device operating during the method of FIG. 3.

The method 300 then proceeds to block 304 where the I/O scheduler receives an I/O request. With reference to FIG. 4D, in an embodiment of block 304, the processing subsystems 204a and/or 204b in the nodes 204 and/or 206 may operate to execute instructions stored on the memory subsystems 204b and/or 206b in order to provide an application 410, and that application 410 may operate to perform I/O request operations 412 to transmit an I/O request to the I/O scheduler 402. In the examples below, the I/O request provided via the I/O request operations 412 includes a request to provide data that has been received by the NIC device 208 for storage on the storage device 210 (e.g., an SSD in this example.) However, while a specific I/O request receive from an application is described in the examples provided below, one of skill in the art in possession of the present disclosure will appreciate that a variety of requests may be provided by a variety of computing device subsystems at block 304 while remaining within the scope of the present disclosure as well. For example, rather than providing data on the storage device 210, the I/O request may provide for transmission of the data for storage on one of the memory subsystems 204b or 206b (i.e., rather than on the storage device 210), or may provide for the transmission of data by the network interface controller device 208 via a remote I/O hub device connected to that network interface controller device 208 and to a remote memory subsystem connected to that remote I/O hub device. As such, at block 304, the I/O scheduler engine providing the I/O scheduler 402 may receive the I/O request via the I/O request operations 412.

Figure 4E:
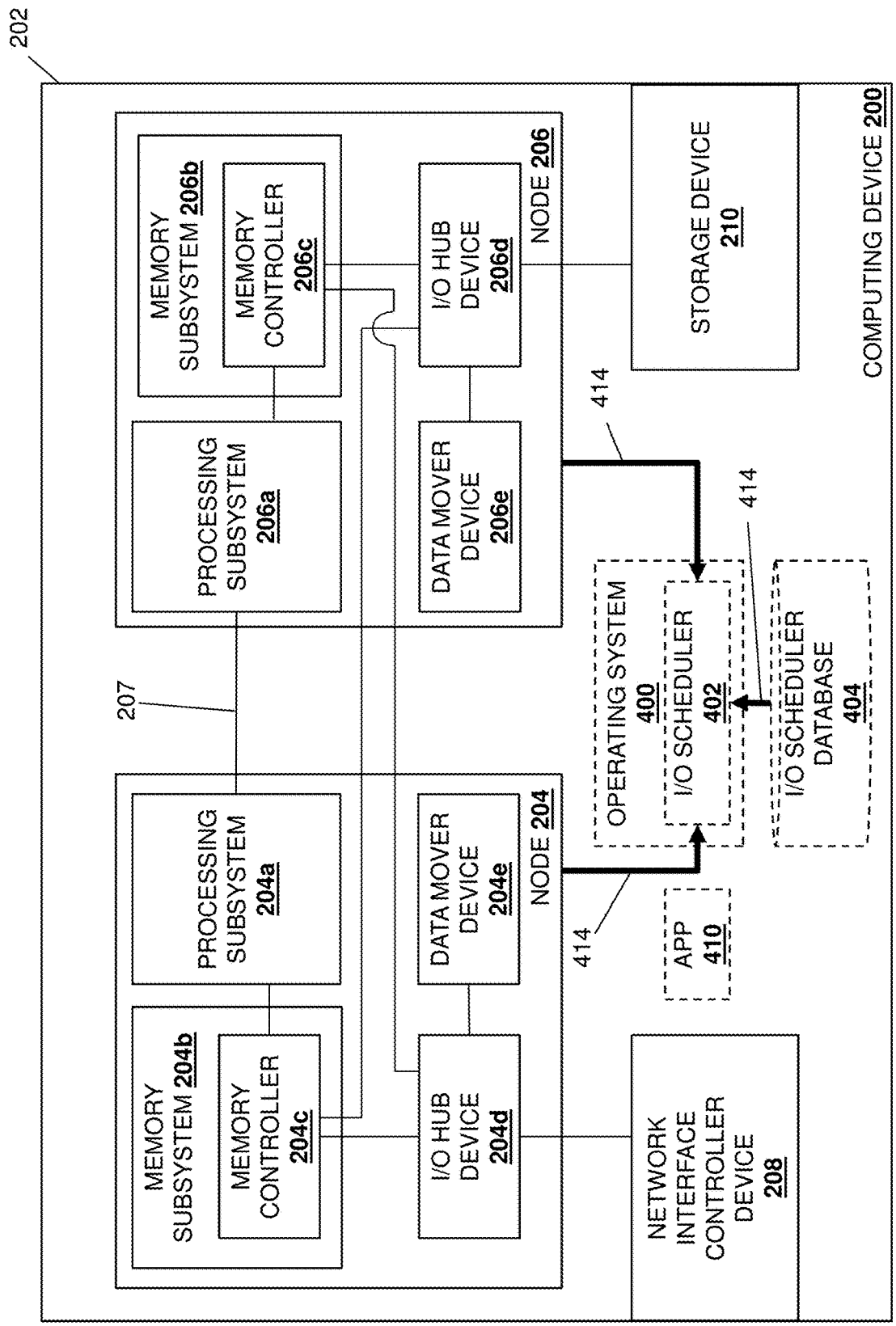
FIG. 4E is a schematic view illustrating an embodiment of the computing device operating during the method of FIG. 3.

The method 300 then proceeds to block 306 where the I/O scheduler identifies an operating level of I/O devices that are configured to satisfy the I/O request. With reference to FIG. 4E, in an embodiment of block 306, the I/O scheduler engine providing the I/O scheduler 402 may operate to perform operating level determination operations 414 that may include using the I/O operation scheduling registration information stored in the I/O scheduler database 404 to identify the I/O devices in the computing device 200, and then retrieving operating levels of those I/O devices via each of the nodes 204 and 206. For example, at block 306, the I/O scheduler 402 may identify the memory controller 204c using the I/O operation scheduling registration information stored in the I/O scheduler database 404, and retrieve an operating level of the memory controller 204c via a performance counter for the memory controller 204c in the I/O hub device 204d. Similarly, at block 306, the I/O scheduler 402 may identify the I/O hub device 204d using the I/O operation scheduling registration information stored in the I/O scheduler database 404, and retrieve an operating level of the I/O hub device 204d via a performance counter for the I/O hub device 204d in the I/O hub device 204d. Similarly, at block 306, the I/O scheduler 402 may identify the data mover device 204e using the I/O operation scheduling registration information stored in the I/O scheduler database 404, and retrieve an operating level of the data mover device 204e via a performance counter for the data mover device 204e in the I/O hub device 204d.

Similarly, at block 306, the I/O scheduler 402 may identify the memory controller 206c using the I/O operation scheduling registration information stored in the I/O scheduler database 404, and retrieve an operating level of the memory controller 206c via a performance counter for the memory controller 206c in the I/O hub device 206d. Similarly, at block 306, the I/O scheduler 402 may identify the I/O hub device 206d using the I/O operation scheduling registration information stored in the I/O scheduler database 404, and retrieve an operating level of the I/O hub device 206d via a performance counter for the I/O hub device 206d in the I/O hub device 206d. Similarly, at block 306, the I/O scheduler 402 may identify the data mover device 206e using the I/O operation scheduling registration information stored in the I/O scheduler database 404, and retrieve an operating level of the data mover device 206e via a performance counter for the data mover device 206e in the I/O hub device 206d. However, while a specific example of the determination of I/O device operating levels via performance counters in I/O hub devices has been described, one of skill in the art in possession of the present disclosure will recognize that operating levels for I/O devices may be identified at block 306 in a variety of other manners that will fall within the scope of the present disclosure as well.

In some embodiments, the identification of the operating levels of I/O devices at block 306 may be limited to I/O devices that are configured to perform I/O operations that satisfy the I/O request received at block 304. In different embodiments, the I/O request that provides data that has been received by the NIC device 208 for storage on the storage device 210 (e.g., an SSD in this example) may be satisfied by different subsets of I/O devices in the computing device 200. In one example, the I/O request received at block 304 may be satisfied by I/O operations that include providing the data received by the NIC device 208 via the I/O hub device 204d to the memory controller 204c for storage in the memory subsystem 204b, and then reading that data onto the storage device 210 from the memory subsystem 204b via the I/O hub device 206d and the memory controller 204c. In another example, the I/O request received at block 304 may be satisfied by I/O operations that include providing the data received by the NIC device 208 via the I/O hub device 204d to the memory controller 206c for storage in the memory subsystem 206b, and then reading that data to the storage device 210 from the memory subsystem 206b via the I/O hub device 206d. As such, in some embodiments, the I/O scheduler 402 may operate at block 306 to only identify operating levels of I/O devices that are configured to perform at least one I/O operation that satisfies the I/O request.

Furthermore, in some embodiments, the I/O request received at block 304 may constrain one or more I/O operations for performance by one or more I/O devices. For example, the I/O request that provides data that has been received by the NIC device 208 for storage on the storage device 210 (e.g., an SSD in this example) may require a Direct Memory Access (DMA) write operation to the memory subsystem 204b, thus requiring data received by the NIC device 208 to be provided via the I/O hub device 204d to the memory controller 204c for storage in the memory subsystem 204b. In such a situation, options for providing that data for storage on the storage device 210 may include the data mover device 204e copying the data from the memory subsystem 204b to the memory subsystem 206b and the storage device 210 retrieving that data from the memory subsystem 206b via the I/O hub device 206d and the memory controller 206c, or the storage device 210 retrieving the data from the memory subsystem 204b via the I/O hub device 206d and the memory controller 204c.

As will be appreciated by one of skill in the art in possession of the present disclosure, in some embodiments of the computing device 200, the storage device 210 may be configured to retrieve data in the memory subsystem 204b directly, while in other embodiments of the computing device 200, the storage device 210 may only be configured to retrieve data in the memory subsystem 206b, thus requiring that data be moved (e.g., via the data mover device 204e or 206e) from the memory subsystem 204b to the memory subsystem 206b. Thus, one of skill in the art in possession of the present disclosure will recognize that a wide variety of different subsets of the I/O devices in the computing device 200 may be configured to satisfy the I/O request while remaining within the scope of the present disclosure, and the operating levels of any of those I/O devices may be determined at block 306 while remaining within the scope of the present disclosure as well.

Figure 4F:
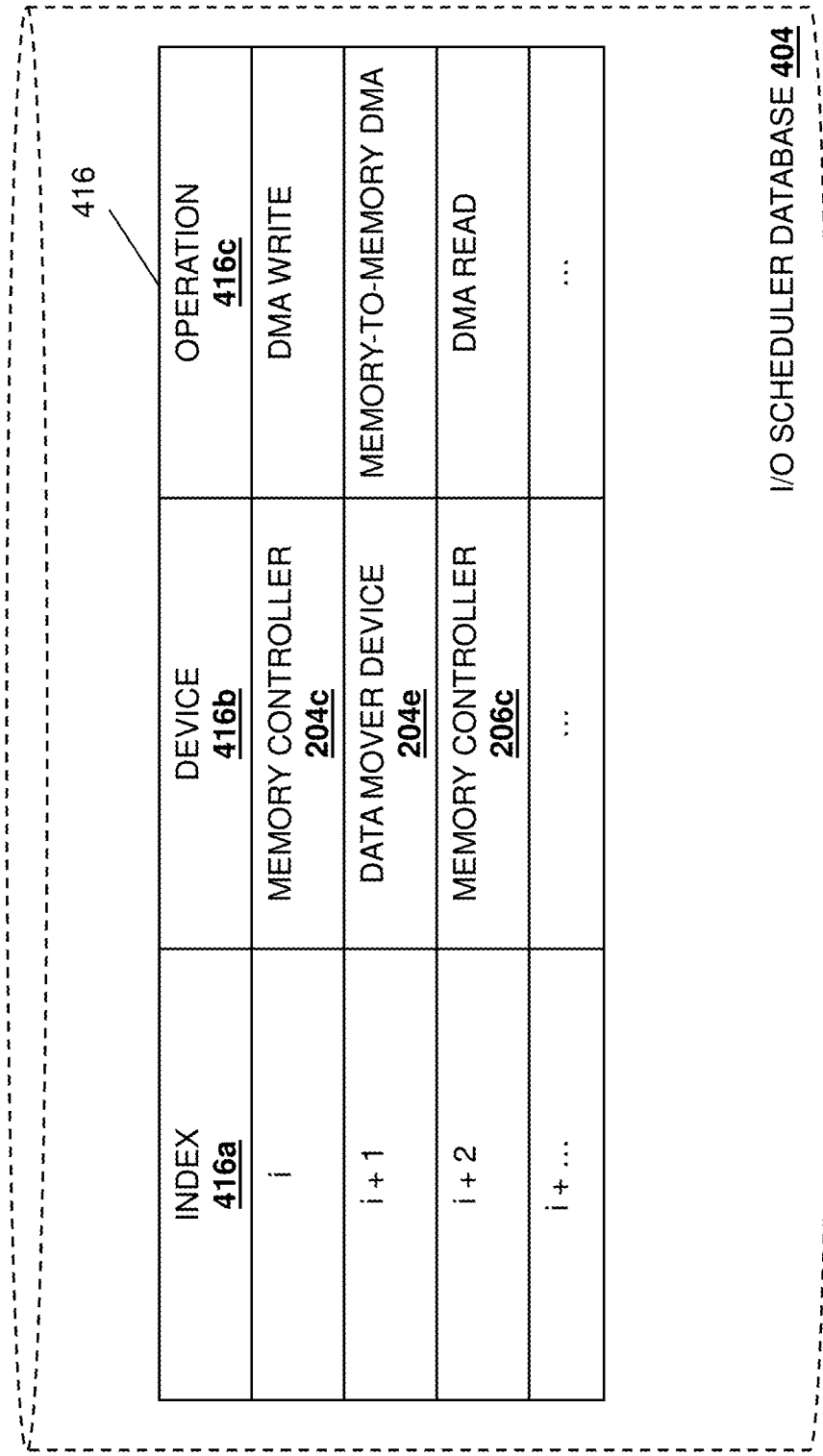
FIG. 4F is a schematic view illustrating an embodiment of an I/O scheduler database provided in the computing device during the method of FIG. 3.

The method 300 then proceeds to block 308 where the I/O scheduler selects a subset of the I/O devices for satisfying the I/O request. In an embodiment, at block 308, the I/O scheduler engine in the I/O scheduler 402 may operate to select a subset of the I/O devices in the computing device 200 to perform one or more I/O operations that satisfy the I/O request received at block 304. For example, with reference to FIG. 4F, an I/O scheduler queue 416 is illustrated that may be provided in the I/O scheduler database 404 and that may be populated by the I/O scheduler 402 at block 308 with I/O devices and I/O operations that satisfy the I/O request received at block 304. In the illustrated embodiment, the I/O scheduler queue 416 includes an index column 416a that provides ordering for the I/O operations identified in the I/O scheduler queue 416, a device column 416b that identifies the I/O device performing the I/O operations identified in the I/O scheduler queue 416, and an operation column 416c that identifies the I/O operation that should be performed. As such, in the specific example illustrated in FIG. 4F, a DMA write operation (e.g., from the NIC device 208 to the memory subsystem 204b) is queued first for performance by the memory controller 204c, a memory-to-memory DMA operation (e.g., from the memory subsystem 204b to the memory subsystem 206b) is queued second for performance by the data mover 204e, and a DMA read operation (e.g., from the memory subsystem 206b for storage on the storage device 210) is queued third for performance by the memory controller 206c, in order to satisfy the I/O request received at block 304.

As will be appreciated by one of skill in the art in possession of the present disclosure, the I/O operations identified in the I/O scheduler queue 416 discussed above with reference to FIG. 4F may have been determined to avoid congestion in one or more of the I/O devices in the computing device 200. As such, while the "shortest" data operation path to satisfy the I/O request may include providing the data from the NIC device 208 to the memory subsystem 206b and having the storage device 210 retrieve that data from the memory subsystem 206b, the provisioning of the data from the NIC device 208 to the memory subsystem 204b, the copying of that data from the memory subsystem 204b to the memory subsystem 206b, and the retrieval of that data by the storage device 210 from the memory subsystem 206b may avoid congestion in one or more of the I/O devices in the computing device 200 (i.e., as determined using the operating levels retrieved at block 306.) As such, the I/O devices and I/O operations selected for satisfying an I/O request may consider the data operation "pipeline" in that computing device that includes the operating levels of each of the I/O devices, which may include consideration of operating levels of those I/O device(s) prior to that data operation and operating levels of those I/O device(s) subsequent to that data operation, which one of skill in the art in possession of the present disclosure will recognize may help to improve cache locality, cache injection of data, and ongoing I/O activities.

In a specific example, the provisioning of the data from the NIC device 208 to the memory subsystem 204b, and the retrieval of the data from the from the memory subsystem 206b by the storage device 210, may both be mandated by the I/O request received at block 304, and thus the identification of the data mover device 204e for performing the memory-to-memory DMA operation (e.g., from the memory subsystem 204b to the memory subsystem 206b) in the example provided above may be based on the relatively operating levels of those data mover devices 204e and 206e (i.e., the data mover device 204e may be selected in response to determining that the data mover device 206e is currently performing more data operations and/or otherwise has a higher operating level than the data mover device 204e). However, while a few specific examples are provided, one of skill in the art in possession of the present disclosure will recognize how a variety of I/O devices may be identified for performing a variety of I/O operations to satisfy a variety of I/O requests at block 308 while remaining within the scope of the present disclosure as well.

Figure 4G:
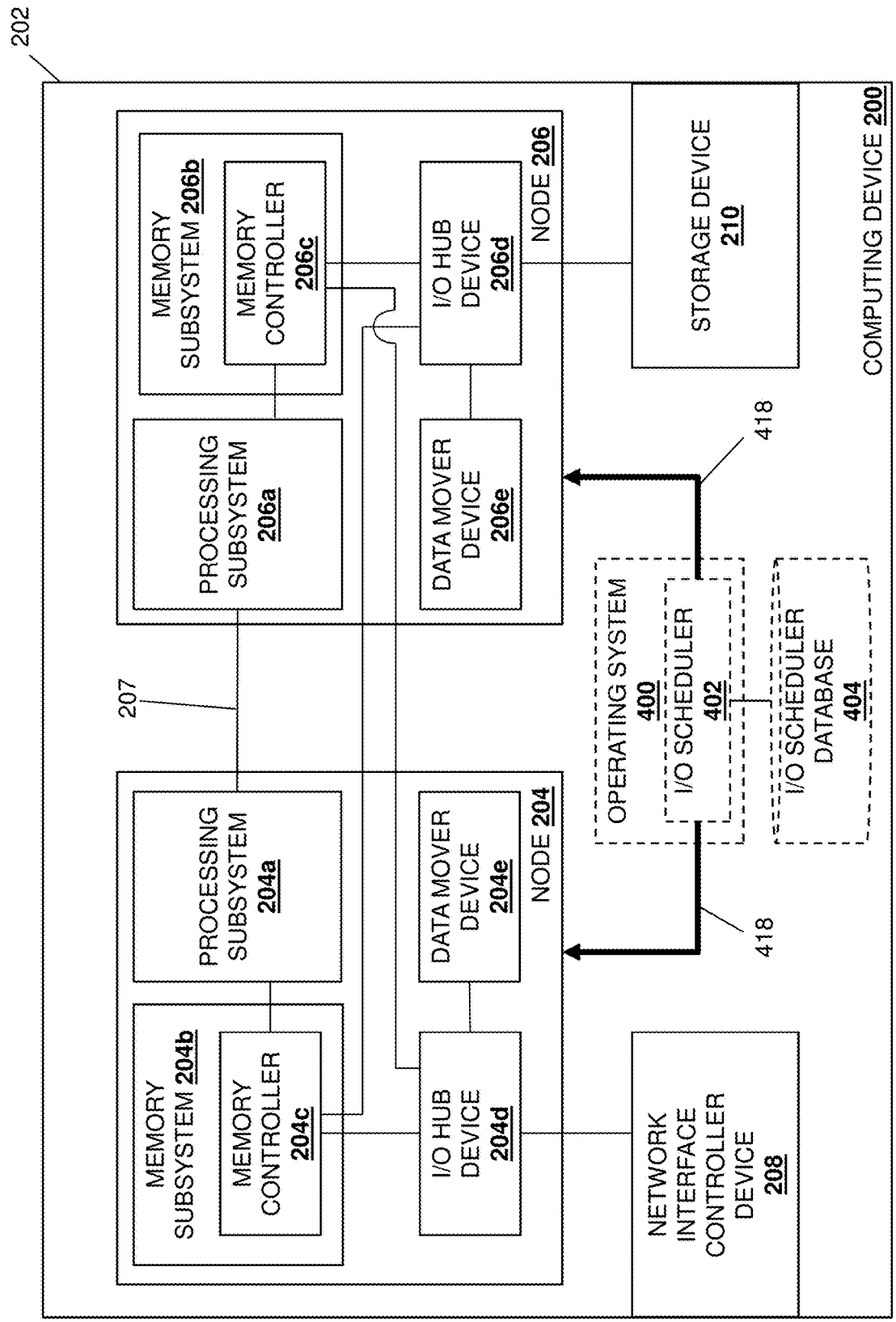
FIG. 4G is a schematic view illustrating an embodiment of the computing device operating during the method of FIG. 3.

The method 300 then proceeds to block 310 where the I/O scheduler transmits I/O operation instruction(s) to the subset of I/O devices. With reference to FIG. 4G, in an embodiment of block 310, the I/O scheduler engine providing the I/O scheduler 402 may perform I/O operation instruction transmission operations 418 to transmit I/O operation instructions to the drivers associated with the subset of I/O devices selected at block 308. Continuing with the specific example provided for the I/O scheduler queue 416, the I/O operation instruction transmission operations 418 may include the transmission of I/O operation instructions to drivers associated with each of the memory controller 204c, the data mover device 204e, and the memory controller 206c. Furthermore, in the specific example in which the provisioning of the data from the NIC device 208 to the memory subsystem 204b and the retrieval of the data from the from the memory subsystem 206b by the storage device 210 was mandated by the I/O request received at block 304, the I/O operation instruction transmission operations 418 may include the transmission of I/O operation instructions to driver(s) associated with the data mover devices 204e and 206e (e.g., to cause those driver(s) to select the data mover device 204e for performing the memory-to-memory DMA operation (e.g., from the memory subsystem 204b to the memory subsystem 206b)). However, while a few specific examples are provided, one of skill in the art in possession of the present disclosure will recognize how a variety of I/O operation instructions may be transmitted to I/O devices selected for satisfying an I/O request while remaining within the scope of the present disclosure as well. As will be appreciated by one of skill in the art in possession of the present disclosure, following the receiving of the I/O operation instructions, the I/O devices in the computing device 200 receiving those I/O operation instructions will operate to perform the corresponding I/O operations in order to satisfy the I/O request received at block 304.

Thus, systems and methods have been described that provide for the selection of I/O device(s) in a computing device for performing a data operation based on a data operation "pipeline" in that computing device, which operates to consider an operating level of available I/O device(s) prior to that data operation, and the operating level of available I/O device(s) subsequent to that data operation, which helps to improve cache locality, cache injection of data, and ongoing I/O activities via the selection of the I/O device(s) for performing the data operation. For example, the I/O device selection system includes an I/O scheduler that is coupled to a plurality of I/O devices that are coupled to a memory system, with the I/O scheduler receiving an I/O request that that is directed to the memory system, determining at least one I/O operation that is configured to satisfy the I/O request, and identifying an operating level of the plurality of I/O devices that are configured to perform the at least one I/O operation. Based on the operating level of the plurality the I/O devices, the I/O scheduler selects a subset of the plurality of I/O devices for performing the at least one I/O operation, and transmits at least one I/O operation instruction that is configured to cause the subset of the plurality of I/O devices to perform the at least one I/O operation in order to satisfy the I/O request. As such, the subset of I/O device(s) in a computing device that are selected to perform a data operation may be the most efficient I/O devices for performing that data operation in the computing device based on a current operating situation of that computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An Input/Output (I/O) device selection system, comprising:
   at least one memory device that is configured to store data;
   a plurality of Input/Output (I/O) devices that are separate from and coupled to the at least one memory device; and
   an I/O scheduler that is coupled to the plurality of I/O devices that the I/O scheduler previously registered for I/O device selection in an I/O scheduler database included in the I/O scheduler, wherein the I/O scheduler is configured to:
      receive an I/O request that involves the at least one memory device;
      determine at least one I/O operation that is configured to satisfy the I/O request;
      identify, using the I/O scheduler database, the plurality of I/O devices that are configured to perform the at least one I/O operation;
      determine an operating level of each of the plurality of I/O devices such that a relative performance of at least two of the plurality of I/O devices that are the same type of I/O device is identified;
      select, based on the operating level of the plurality the I/O devices, a subset of the plurality of I/O devices for performing the at least one I/O operation; and
      transmit at least one I/O operation instruction that is configured to cause the subset of the plurality of I/O devices to perform the at least one I/O operation in order to satisfy the I/O request.

2. The system of claim 1, wherein the I/O scheduler is configured to register the plurality of I/O devices in the I/O scheduler database by:
   receiving, from each of the plurality of I/O devices, I/O operation scheduling registration information; and
   storing the I/O operation scheduling registration information in the I/O scheduler database, wherein the plurality of I/O devices that are configured to perform the at least one I/O operation are identified using the I/O operation scheduling information received from each of the plurality of I/O devices and stored in the I/O scheduler database.

3. The system of claim 1, wherein the I/O scheduler is configured to identify the operating level of the plurality of I/O devices that are configured to perform the at least one I/O operation by accessing the operating level of the plurality of I/O devices via at least one I/O hub device coupled to the plurality of I/O devices.

4. The system of claim 1, wherein the plurality of I/O devices include at least one of a memory controller, an I/O hub device, or a data mover device.

5. The system of claim 1, wherein the at least one I/O operation includes at least one of a write operation, a read operation, or a memory-to-memory transfer operation.

6. The system of claim 1, wherein the selecting the subset of the plurality of I/O devices for performing the at least one I/O operation based on the operating level of the plurality the I/O devices includes selecting a first I/O device included in the subset of the plurality of I/O devices to perform the at least one I/O operation over a second I/O device that is not included in the subset of the plurality of I/O devices, is the same type of I/O device as the first I/O device, and that has a higher operating level than the first I/O device.

7. An Information Handling System (IHS), comprising:
   a processing system; and
   a memory system that is coupled to the processing system and that includes instructions that, when executed by the processing system, cause the processing system to provide a Input/Output (I/O) scheduler engine that is configured to:
      receive an I/O request that involves at least one memory device that is configured to store data;
      determine at least one I/O operation that is configured to satisfy the I/O request;
      identify, using an I/O scheduler database in which a plurality of I/O devices were previously registered for I/O device selection, the plurality of I/O devices that are separate from and coupled to the at least one memory device and that are configured to perform the at least one I/O operation;
      determine an operating level of each of the plurality of I/O devices such that a relative performance of at least two of the plurality of I/O devices that are the same type of I/O device is identified;
      select, based on the operating level of the plurality the I/O devices, a subset of the plurality of I/O devices for performing the at least one I/O operation; and transmit at least one I/O operation instruction that is configured to cause the subset of the plurality of I/O devices to perform the at least one I/O operation in order to satisfy the I/O request.

8. The IHS of claim 7, wherein the I/O scheduler is configured to register the plurality of I/O devices in the I/O scheduler database by:
receiving, from each of the plurality of I/O devices, I/O operation scheduling registration information; and
storing the I/O operation scheduling registration information in the I/O scheduler database, wherein the plurality of I/O devices that are configured to perform the at least one I/O operation are identified using the I/O operation scheduling information received from each of the plurality of I/O devices and stored in the I/O scheduler database.

9. The IHS of claim 7, wherein the I/O scheduler is configured to:
access the operating level of the plurality of I/O devices via at least one I/O hub device coupled to the plurality of I/O devices in order to identify the operating level of the plurality of I/O devices that are configured to perform the at least one I/O operation.

10. The IHS of claim 7, wherein the plurality of I/O devices include at least one of a memory controller, an I/O hub device, or a data mover device.

11. The IHS of claim 7, wherein the at least one I/O operation includes at least one of a write operation, a read operation, or a memory-to-memory transfer operation.

12. The IHS of claim 7, wherein the selecting the subset of the plurality of I/O devices for performing the at least one I/O operation based on the operating level of the plurality the I/O devices includes selecting a first I/O device included in the subset of the plurality of I/O devices to perform the at least one I/O operation over a second I/O device that is not included in the subset of the plurality of I/O devices, is the same type of I/O device as the first I/O device, and that has a higher operating level than the first I/O device.

13. The IHS of claim 7, wherein the at least one memory device includes at least one first memory device that is provided as part of a first node and at least one second memory device that is provided as part of a second node, and wherein the plurality of I/O devices includes a plurality of first I/O devices that are provided as part of the first node and a plurality of second I/O devices that are provided as part of the second node.

14. A method for selecting (Input/Output) I/O devices for satisfying an I/O request, comprising:
receiving, by an Input/Output (I/O) scheduler, an I/O request that involves at least one memory device that is configured to store data;
determining, by the I/O scheduler, at least one I/O operation that is configured to satisfy the I/O request;
identifying, by the I/O scheduler using an I/O scheduler database in which a plurality of I/O devices were previously registered for I/O device selection, the plurality of I/O devices that are separate from and coupled to the at least one memory device and that are configured to perform the at least one I/O operation;
determining, by the I/O scheduler, an operating level of each of the plurality of I/O devices such that a relative performance of at least two of the plurality of I/O devices that are the same type of I/O device is identified;
selecting, by the I/O scheduler based on the operating level of the plurality the I/O devices, a subset of the plurality of I/O devices for performing the at least one I/O operation; and
transmitting, by the I/O scheduler, at least one I/O operation instruction that is configured to cause the subset of the plurality of I/O devices to perform the at least one I/O operation in order to satisfy the I/O request.

15. The method of claim 14, further comprising:
receiving, by the I/O scheduler from each of the plurality of I/O devices, I/O operation scheduling registration information; and
storing, by the I/O scheduler, the I/O operation scheduling registration information in the I/O scheduler database, wherein the plurality of I/O devices that are configured to perform the at least one I/O operation are identified using the I/O operation scheduling information received from each of the plurality of I/O devices and stored in the I/O scheduler database.

16. The method of claim 14, further comprising:
accessing, by the I/O scheduler, the operating level of the plurality of I/O devices via at least one I/O hub device coupled to the plurality of I/O devices in order to identify the operating level of the plurality of I/O devices that are configured to perform the at least one I/O operation.

17. The method of claim 14, wherein the plurality of I/O devices include at least one of a memory controller, an I/O hub device, or a data mover device.

18. The method of claim 14, wherein the at least one I/O operation includes at least one of a write operation, a read operation, or a memory-to-memory transfer operation.

19. The method of claim 14, wherein the selecting the subset of the plurality of I/O devices for performing the at least one I/O operation based on the operating level of the plurality the I/O devices includes selecting a first I/O device included in the subset of the plurality of I/O devices to perform the at least one I/O operation over a second I/O device that is not included in the subset of the plurality of I/O devices, is the same type of I/O device as the first I/O device, and that has a higher operating level than the first I/O device.

20. The method of claim 14, wherein the at least one memory device includes at least one first memory device that is provided as part of a first node and at least one second memory device that is provided as part of a second node, and wherein the plurality of I/O devices includes a plurality of first I/O devices that are provided as part of the first node and a plurality of second I/O devices that are provided as part of the second node.

* * * * *